United States Patent [19]

Kleinschmit et al.

[11] Patent Number: 5,658,005
[45] Date of Patent: Aug. 19, 1997

[54] REAR AXLE FOR A MOTOR VEHICLE

[75] Inventors: Einhard Kleinschmit, Esslingen; Thomas Huch, Ebersbach; Johann Süss, Korb, all of Germany

[73] Assignee: Mercedes-Benz AG, Germany

[21] Appl. No.: 512,135

[22] Filed: Aug. 7, 1995

[30] Foreign Application Priority Data

Aug. 5, 1994 [DE] Germany ............... 44 27 716.4

[51] Int. Cl.$^6$ .................................................. B60G 3/00
[52] U.S. Cl. .......................... 280/673; 280/136; 280/675; 280/690
[58] Field of Search ..................... 280/673, 675, 280/690, 125, 136, 724, 725, 663, 701, 713, 688

[56] References Cited

U.S. PATENT DOCUMENTS

| | | |
|---|---|---|
| 2,085,662 | 6/1937 | Johnson . |
| 4,593,930 | 6/1986 | Davis ............................ 280/690 |

FOREIGN PATENT DOCUMENTS

| | | | |
|---|---|---|---|
| 13091 | 1/1991 | France ............................ 280/701 |
| 2256358 | 5/1974 | Germany . | |
| 3001530 | 7/1981 | Germany . | |
| 3828828 | 3/1989 | Germany . | |
| 0317727 | 5/1989 | Germany . | |
| 4110571 | 12/1991 | Germany . | |
| 185308 | 10/1983 | Japan ............................ 280/701 |
| 235208 | 10/1986 | Japan ............................ 280/701 |
| 1013311 | 4/1983 | U.S.S.R. ....................... 280/725 |

*Primary Examiner*—Eric D. Culbreth
*Attorney, Agent, or Firm*—Evenson, McKeown, Edwards & Lenahan P.L.L.C.

[57] ABSTRACT

A rear axle for a motor vehicle has a control arm which is pivotally connected to the vehicle body so that it can be rotated about an axis extending transversely with respect to the longitudinal center plane of the vehicle. The control arm extends against the forward driving direction and a wheel is disposed on its end facing away from the control arm bearing. A supporting strut is also provided which, by means of its one end in the area close to the wheel, is connected with the control arm, the distance of the end of the supporting strut close to the wheel to the longitudinal axis of the control arm not being larger than the distance of a linking point of the supporting strut away from the wheel to the longitudinal axis of the control arm. For simplifying the manufacturing as well as the mounting of the rear axle, it is provided that the end of the supporting strut away from the wheel in the area of the control arm is linked directly to the control arm and both ends of the supporting strut are rigidly connected with the control arm.

20 Claims, 1 Drawing Sheet

REAR AXLE FOR A MOTOR VEHICLE

BACKGROUND AND SUMMARY OF THE INVENTION

This invention relates to a rear axle arrangement for a motor vehicle of the type comprising:

at least one control arm which is pivotally connected to the vehicle body so that it can be rotated about an axis extending transversely with respect to the longitudinal center plane of the vehicle, which control arm extends against the forward driving direction and on whose end facing away from the control arm bearing, a wheel is disposed, and a supporting strut which, by means of its one end in an area close to the wheel, is connected with the control arm, the distance of the end of the supporting strut close to the wheel from the longitudinal axis of the control arm not being larger than the distance of a linking point of the supporting strut away from the wheel from the longitudinal axis of the control arm.

From German Patent Document DE-OS 38 28 828, a compound-control-arm rear axle is known whose two longitudinal control arms are connected with one another by way of a torsionally soft transverse strut. For the support with respect to side forces, a supporting strut is provided which, in each case, in the area close to the wheel is pivotally connected to a supporting pin molded onto the longitudinal control arm and, on its other end, is pivotally connected on the transverse strut connecting the two longitudinal control arms with one another. The distance of the end of the supporting strut close to the wheel from the longitudinal axis of the longitudinal control arm in this case is shorter than the distance of the pivotal connecting point on the transverse strut from the longitudinal axis of the longitudinal control arm. In the case of this rear axle, it is a disadvantage that the supporting strut must be connected with the longitudinal control arm and with the transverse strut in a hinged manner. The reason is that a hinged linking of the supporting strut on the transverse strut as well as on the longitudinal control arm results in increased constructional, manufacturing and mounting expenditures.

It is therefore an object of the invention to provide a rear axle of the type referred to above which has a simpler construction and is therefore easier to manufacture and mount.

As a result of the fact that, in the case of the rear axle according to the invention, the strut supporting the lateral forces is rigidly connected on its two ends with the control arm, hinges in the connecting area are no longer required. The control arm can therefore be manufactured at reasonable cost as a one-piece component, for example, by means of casting or welding. Furthermore, one torsionally soft transverse strut which connects the two control arms and to which the supporting strut must be pivotally connected will not be necessary, whereby additional space is saved. The suspension of the body may take place, for example, by way of coil springs which are supported on the control arm at a distance from the control arm bearing.

In certain preferred embodiments, the bearing-side area of the control arm is constructed to be widened in the direction of the exterior side of the vehicle, and the supporting strut may be arranged on the side of the control arm which faces the exterior side of the vehicle, whereby more space is saved between the two control arms. As desired, the two control arms of the rear axle may nevertheless also be connected with one another by way of a torsionally soft transverse strut, in which case then, because of the fact that the supporting strut is fastened with its two ends on the control arm itself, an impairment of the suspension during the alternate compression and rebounding by means of a supporting strut linked to the torsionally soft transverse strut is excluded.

According to certain preferred embodiments, the distance of the supporting strut to the longitudinal axis of the control arm in the area close to the wheel is the same as its distance in the area of the control arm bearing to the longitudinal axis of the longitudinal control arm, and therefore a neutral roll steer effect will exist under the influence of side forces.

An understeering roll steer effect under the influence of side forces (wheel which is on the outside during cornering goes into toe-in) will be achieved according to certain preferred embodiments wherein the distance of the supporting strut to the longitudinal axis of the control arm in the area close to the wheel is less than in the area of the control arm bearing.

Other objects, advantages and novel features of the present invention will become apparent from the following detailed description of the invention when considered in conjunction with the accompanying drawings.

DETAILED DESCRIPTION OF THE DRAWINGS

Figure 1:
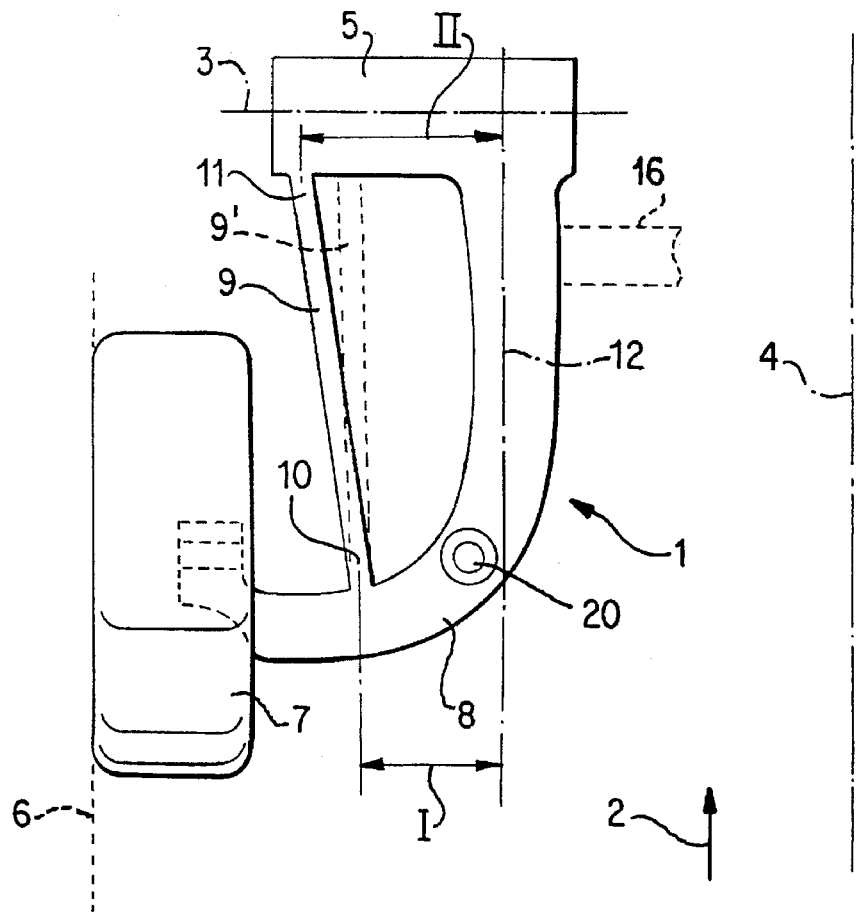
FIG. 1 is a basic diagram of a cut-out top view of an embodiment of a rear axle according to the invention.

In a top view, FIG. 1 illustrates a control arm of a rear axle of a motor vehicle which is constructed as a longitudinal control arm 1 and which extends against the forward driving direction (the forward driving direction of the vehicle is indicated by the arrow 2) and is pivotally connected (longitudinal control arm bearing 5) to the vehicle body so that it can be rotated about an axis 3 which extends normally (perpendicularly) with respect to the longitudinal center plane 4 of the vehicle. For reasons of simplicity, only one longitudinal control arm 1 is shown of the rear axle, specifically the longitudinal control arm arranged in the forward driving direction on the left of the longitudinal center plane 4 of the vehicle. Mirror-inverted conditions exist on the other side of the longitudinal center plane 4 of the vehicle.

On the side facing away from the longitudinal control arm bearing 5, the longitudinal control arm 1 is constructed to be curved in the direction of the exterior side 6 of the vehicle, a wheel 7 being disposed on its end facing away from the longitudinal control arm bearing 5. In the curved area 8, a supporting device 20 for a supporting spring (coil spring) which cushions the vehicle body and for reasons of clarity is not shown in the drawing is molded onto the longitudinal control arm 1. The suspension of the vehicle may take place by means of torsion bars instead of by means of coil springs according to other contemplated embodiments.

In the area of the longitudinal control arm bearing 5, the longitudinal control arm 1 is constructed to be widened in the direction of the exterior vehicle side 6. For stiffening the longitudinal control arm 1, a supporting strut 9 is provided which is rigidly connected with the longitudinal control arm 1, specifically on its one end 10 in the curved area close to the wheel and, on its other end 11, in the area of the longitudinal control arm bearing 5 constructed to be widened. In this case, the distance between the supporting strut 9 and the longitudinal axis 12 of the longitudinal control arm is shorter in the area (I) close to the wheel than in the area of the longitudinal control arm bearing 5 (II).

Figure 2:
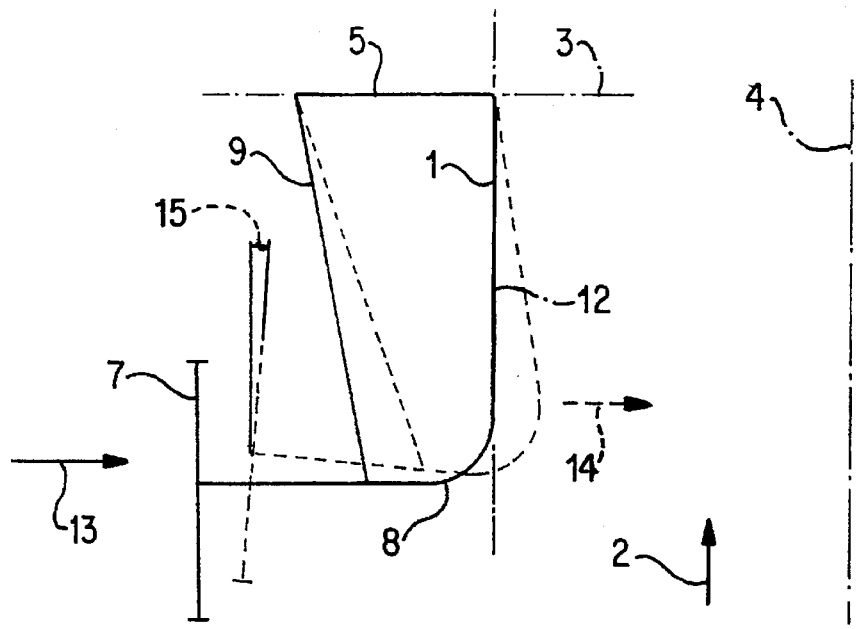
FIG. 2 is a basic diagram of the elastokinematic behavior of the longitudinal control arm of the FIG. 1 arrangement under the influence of a lateral force.

If a side force acts upon the rear axle (for example, during cornering) in the direction of the arrow 13 (FIG. 2) and, because of this force and because of its elasticity, the longitudinal control arm 1 is correspondingly deformed in the direction of the longitudinal center plane of the vehicle (arrow 14), because of the fact that its distance from the longitudinal axis 12 of the longitudinal control arm in the area close to the wheel is shorter than in the area of the control arm bearing 5, the supporting strut 9 acts as a tie rod and, at the same time, pulls the wheel 7 by way of the curved portion 8 of the longitudinal control arm 1 into toe-in (arrow 15), as illustrated schematically in FIG. 2 (the broken-line representation shows the arrangement under the influence of the side force).

For reasons of clarity, the deforming of the longitudinal control arm 1 illustrated in FIG. 2 is shown to be very exaggerated. In contrast, the deformations occurring under real conditions are in the range of only a few angular minutes.

In this shown embodiment, the longitudinal control arm 1 and the supporting strut 9 form one component which is produced by casting. Another manufacturing process is also contemplated in which the supporting strut 9 may be connected with the longitudinal control arm 1, for example, by means of welding.

In a further embodiment of the invention, the supporting strut is arranged in such a manner that its distance to the longitudinal axis 12 of the longitudinal control arm in the area close to the wheel is as large as that in the area of the control arm bearing 5 (see supporting strut 9' indicated by a broken line in FIG. 1). In this case, no understeering but a neutral roll steer effect of the rear axle is achieved under the influence of a side force.

The invention is not limited to longitudinal control arm rear axles. Thus, it may also be used in the case of compound control arm rear axles in which the two longitudinal control arms are connected with one another by way of a transverse strut 16 indicated by a broken line in FIG. 1.

The supporting strut may also be arranged on the side of the longitudinal control arm facing away from the exterior side of the vehicle according to certain preferred embodiments of the invention.

Furthermore, the invention is not only limited to pure longitudinal control arm rear axles. The invention may also be used in the case of semi-trailing arms, thus in the case of control arms whose axes of rotation do not extend precisely normally (perpendicularly) with respect to the longitudinal center plane of the vehicle, but are slightly inclined with respect to it.

We claim:

1. Rear axle arrangement for a motor vehicle comprising:
at least one control arm which is pivotally connected to the vehicle body so that the control arm is rotatable about a transverse axis extending transversely with respect to the longitudinal center plane of the vehicle, said control arm extending from said transverse axis to an end of the control arm which is configured to receive a wheel, said control arm having a longitudinal axis which extends generally parallel to said longitudinal center plane of the vehicle, and
a supporting strut having a first end and a second end, said first end being rigidly connected with the control arm proximate the wheel at a first distance from the longitudinal axis of the control arm, said second end being rigidly connected with the control arm proximate the transverse axis at a second distance from the longitudinal axis of the control arm, said first distance being less than or equal to said second distance.

2. Rear axle arrangement according to claim 1, wherein the control arm comprises a widened portion which extends from said longitudinal axis in a direction away from said longitudinal center plane, the supporting strut being arranged on a side of the control arm opposite said longitudinal center plane.

3. Rear axle arrangement according to claim 2, wherein the control arm and the supporting strut comprise a one-piece component.

4. Rear axle arrangement according to claim 3, wherein the first distance is equal to the second distance.

5. Rear axle arrangement according to claim 3, wherein the first distance is less than the second distance.

6. Rear axle arrangement according to claim 2, wherein the first distance is equal to the second distance.

7. Rear axle arrangement according to claim 2, wherein the first distance is less than the second distance.

8. Rear axle arrangement according to claim 1, wherein the control arm and the supporting strut comprise a one-piece component.

9. Rear axle arrangement according to claim 8, wherein the first distance is equal to the second distance.

10. Rear axle arrangement according to claim 8, wherein the first distance is less than the second distance.

11. Rear axle arrangement according to claim 1, wherein the first distance is equal to the second distance.

12. Rear axle arrangement according to claim 1, wherein the first distance is less than the second distance.

13. Rear axle arrangement according to claim 1, wherein said control arm comprises a generally U-shaped configuration.

14. Rear axle arrangement for a motor vehicle comprising:
at least one control arm having a longitudinal portion, a first transverse portion, and a second transverse portion, said longitudinal portion extending between said first transverse portion and said second transverse portion along a longitudinal axis which is substantially parallel to the longitudinal center plane of the vehicle, said first transverse portion extending from said longitudinal portion transversely with respect to said longitudinal axis and being configured to receive a wheel, said second transverse portion extending from said longitudinal portion along a transverse axis extending transversely with respect to said longitudinal axis, said second transverse portion being pivotally connected to the vehicle body such that the control arm is rotatable about said transverse axis; and
a supporting strut having a first end and a second end, said first end being rigidly connected with said first transverse portion of the control arm at a first distance from the longitudinal axis of the control arm, said second end being rigidly connected with said second transverse portion of the control arm at a second distance from the longitudinal axis of the control arm, said first distance being less than or equal to said second distance.

15. Rear axle arrangement according to claim 14, wherein the first distance is equal to the second distance.

16. Rear axle arrangement according to claim 14, wherein the first distance is less than the second distance.

17. Rear axle arrangement according to claim 14, wherein said first transverse portion and said second transverse portion of the control arm both extend from said longitudinal portion of the control arm in a direction away from said longitudinal center plane of the vehicle.

18. Rear axle arrangement according to claim 17, wherein said control arm comprises a generally U-shaped configuration such that said first transverse portion and said second transverse portion form the sides of the U-shaped configuration and the longitudinal portion forms the bottom of the U-shaped configuration, said supporting strut extending between the sides of the U-shaped configuration.

19. Rear axle arrangement according to claim 14, wherein said second transverse portion of the control arm comprises a curved portion.

20. Rear axle arrangement according to claim 14, wherein said control arm is elastically deformable such that a side force applied to the rear axle will deform the control arm toward said longitudinal center plane of the vehicle.

* * * * *